Nov. 3, 1942.        G. T. BLOOM ET AL        2,300,825
                    STORAGE TANK VENT VALVE
                    Filed July 31, 1940        3 Sheets-Sheet 1
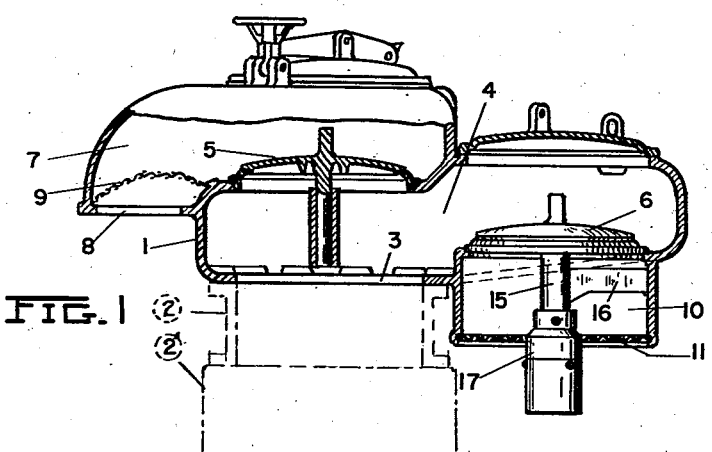
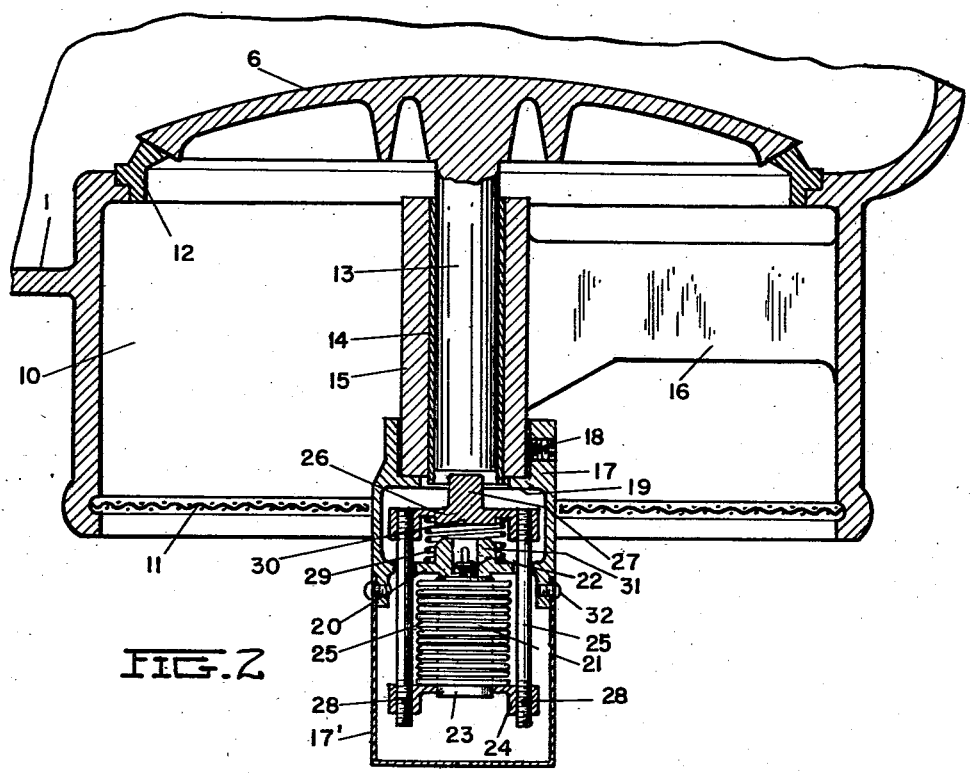
INVENTORS
GEORGE T. BLOOM and
WILLIAM H. McGUNAGLE.
BY
Oberlin, Limbach & Day ATTORNEYS Nov. 3, 1942.  G. T. BLOOM ET AL  2,300,825
STORAGE TANK VENT VALVE
Filed July 31, 1940  3 Sheets-Sheet 2
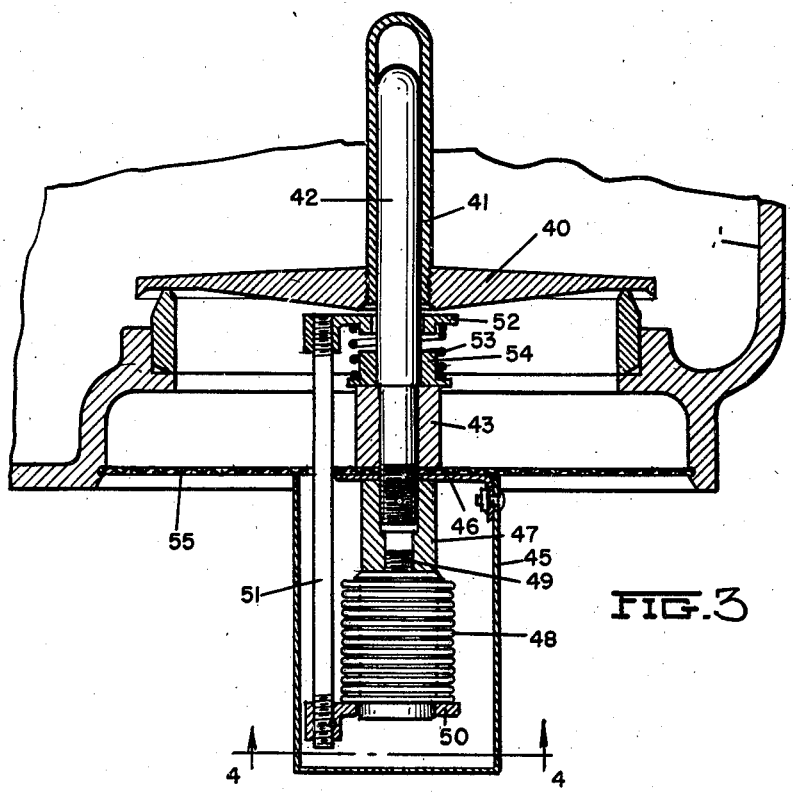
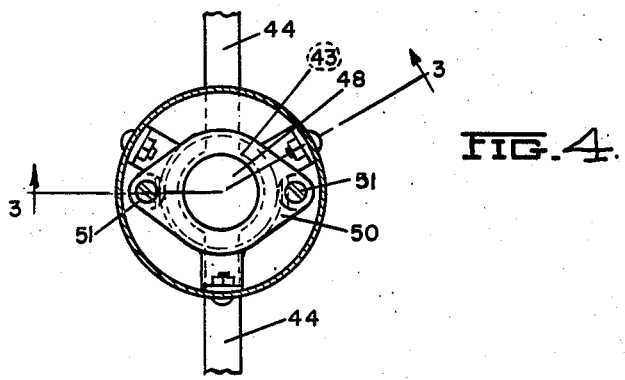
INVENTORS
GEORGE T. BLOOM and
WILLIAM H. McGUNAGLE.
BY
Oberlin, Limbach & Day ATTORNEYS.

Nov. 3, 1942.  G. T. BLOOM ET AL  2,300,825
STORAGE TANK VENT VALVE
Filed July 31, 1940  3 Sheets-Sheet 3
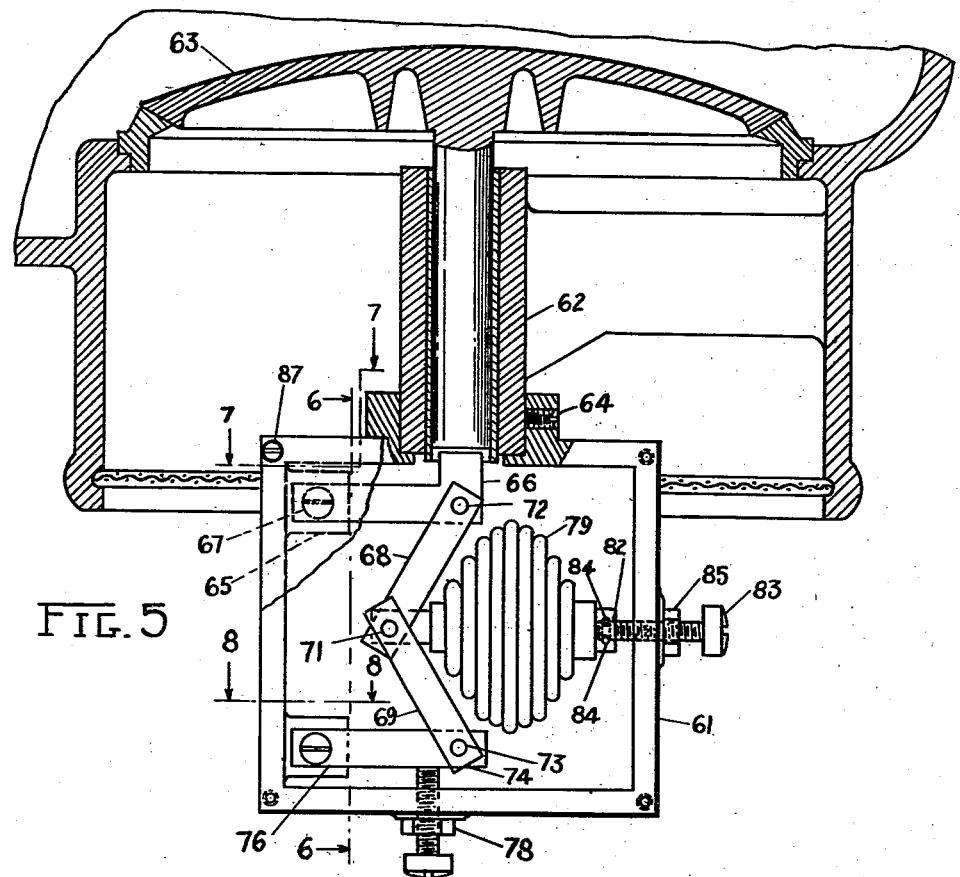
INVENTORS
GEORGE T. BLOOM and
WILLIAM H. McGUNAGLE
BY
Oberlin, Limbach + Day
ATTORNEYS Patented Nov. 3, 1942

2,300,825

UNITED STATES PATENT OFFICE 2,300,825

STORAGE TANK VENT VALVE

George T. Bloom, Plainfield, N. J., and William H. McGunagle, Cleveland, Ohio; said McGunagle assignor to The Johnston & Jennings Company, Cleveland, Ohio, a corporation of Ohio Application July 31, 1940, Serial No. 349,022

10 Claims. (Cl. 236—92)

This invention relates to a vent valve for enclosed tanks or containers, and is particularly adapted for use with tanks or enclosed containers employed for storing volatile fluids such as gasoline, crude petroleum and the like wherein the pressure within the tank varies in accordance with changes in the temperature and pressure of the ambient air and in accordance with variations in the quantity of liquid stored within the tank.

Such enclosed tanks are usually provided with vent valves adapted to be operated by the pressure differential within the tank and the atmospheric pressure surrounding the tank, an outlet valve being provided to vent the tank when the pressure within the tank exceeds the atmospheric pressure and an air intake valve for venting the tank when the pressure within the tank is less than the atmospheric pressure.

In valve devices of this character heretofore devised for venting tanks, the motive force for actuating the devices is obtained solely from the pressure differential existing at the device and since the value of this differential is generally small the force acting on the valve to move it away from the valve seat is relatively weak and, in the case of a zero pressure differential, the motive force is correspondingly reduced to zero.

It is the general practice to install such tanks in exposed places where they are subject to variable weather conditions including freezing and below freezing temperatures and considerable difficulty has been experienced with the vent valves associated with these tanks due to the formation of a coating of ice about the seat of the valve, thereby sealing the valve in a closed position and rendering it unresponsive to the action of the pressure differential. In the case, for example, of continuously falling temperatures, the failure of the intake valve to open due to freezing of the valve to its seat may cause the collapse or rupture of the tank. Similarly, freezing of the intake valve in its closed position may cause damage or collapse of a tank due to the removal of the fluid stored therein. In the case when an inlet valve has just started to open, during near freezing temperatures, the moisture in the air inhaled by the tank, upon coming into contact with the chilled valve, may cause the formation of ice about the valve and thus render the valve inoperative. This condition assumes serious proportions in the case of large tanks, especially when a volatile liquid such as raw petroleum, gasoline and the like is stored therein and is often accompanied by disastrous consequences.

One of the objects of the present invention is the provision of novel and improved means controlled by the temperature for causing a tank to vent. In general the thermo-operated means employed with the present invention may be incorporated in a new valve assembly or it may be readily adapted to vent valves after they have been placed in service for the reason that the thermo-operated control member is normally disengaged from the valve at above freezing temperatures and does not appreciably interfere with or impede the passage of the vented air, gases and vapors.

Another of the objects of the invention resides in the provision of thermo-responsive means for preventing the closure of a vent valve at below freezing temperature.

Another of the objects is a thermo-operated device for automatically operating a vent valve at a predetermined degree of temperature.

A further object resides in a thermo-responsive device for actuating a vent valve having means for varying at will the degree of pressure exerted upon the valve as the device operates.

With these and other objects in view, which will become apparent from the following description of the illustrative embodiments of the invention shown on the accompanying drawings, the invention resides in the novel system, elements of construction, devices and combination of parts in cooperative relationship, as hereinafter more particularly pointed out in the claims.

Referring now to the drawings in which like numerals of reference are employed to designate like parts throughout the several views;

Fig. 1 is an elevational view, partly in section, of a complete storage vent valve assembly and showing the thermo-responsive control element thereof mounted upon the valve guide of the vacuum valve, Fig. 2 is a sectional detailed view, somewhat enlarged, of the vacuum valve and thermo-responsive control element of Fig. 1, Fig. 3 is a sectional detailed view, somewhat enlarged, of an alternative form of construction of the thermo-responsive control element as applied to a different type of vacuum vent valve, taken substantially along the line 3—3 of Fig. 4, Fig. 4 is a horizontal view, partly in section, taken substantially along the line 4—4 of Fig. 3, Fig. 5 is a view, partly in section, of another form of construction of the thermo-responsive element mounted upon the valve guide of the vacuum valve, Fig. 6 is a view, partly in section, taken substantially along the line 6—6 of Fig. 5, and Fig. 7 is a fragmentary view, partly in section, taken along the line 7—7 of Fig. 5.

Fig. 8 is a fragmentary view, partly in section, taken along the line 8—8 of Fig. 5.

Now referring more particularly to the drawings, there is shown therein a vent valve housing 1 which is adapted to be mounted upon the flange of a riser 2, the latter being mounted preferably on the top or roof of a storage tank (not shown). A flame arrester 2' is usually located beneath the vent valve housing 1 and connected to the riser 2. The valve housing 1 has an intake opening 3 leading to the chamber 4 which is normally closed to the atmosphere by the outlet or pressure valve 5 and the intake or vacuum valve 6. The pressure valve 5 opens into the chamber 7 which, in turn, communicates with the atmosphere through the opening 8, the latter being guarded by a woven wire screen 9.

The vacuum valve 6 opens to the chamber 10 whose bottom end, protected by the woven wire screen 11, also communicates with the atmosphere.

The vacuum valve 6 seats upon the insert ring 12 and has a central stem 13 slidably mounted in the bushing 14 held in the fixed support or guide 15. The guide 15, in turn, is joined to the housing 1 by means of integrally cast brackets or arms, such as indicated at 16.

A cylindrical housing 17 is mounted upon the lower end of the valve stem guide 15 by any suitable means such as the set screw shown at 18. The housing 17 has an inwardly, transversely projecting flange 19 adapted to bear against the bottom end of the guide 15. The housing 17 also contains a transverse wall or partition 20 on the lower side of which the thermostatic element or bellows 21 is mounted such as by the threaded connection 22. The thermostatic bellows 21 is filled with a gas or relatively highly volatile material which is thermostatically responsive and operative to longitudinally contract or expand the bellows upon changes in temperature. The lower end 23 of the bellows 21 seats in an opening in the tie plate 24. Tie rods 25 connect the plate 24 with another plate 26 located on the upper side of the housing wall 20. The plate 26 has a centrally projecting lug 27 adapted to contact with the lower end of the valve stem 13, but as shown in Fig. 2, normally occupies a position spaced therefrom. The tie rods 25 are suitably attached at each end to the plates 24 and 26, such as by the end threads as shown in Fig. 2 of the drawings, and anchored against rotation by means of the dowel pins 28. A coil spring 29 is mounted between the upper side of the housing wall 20 and the under side of the tie plate 26 or valve stem abutment member, and tends to urge the latter in an upward direction towards the valve stem 13. Annular bosses 30 and 31 on the plate 26 and the wall 20 respectively are provided for the purpose of maintaining the coil spring 29 in proper position and alignment.

It will be noted that approximately the lower half of the housing 17 is in the form of a separable stamped metal portion 17' removably attached to the upper housing 17 as by the fastening screws 32. This construction is provided to facilitate assembly of the thermostatic element. The housing portions 17 and 17' thus enclose all of the working parts of the thermostatic element and protect them from injury, as well as the clogging or corrosive effects of the vapors passing through the vent valve. The completely assembled thermostatic element and housing 17 can be installed upon the vent valve body by the simple expedient of removing the screen 11 and making a hole therein for the housing 17, thereafter tightening the set screw 18 and replacing the screen, if desired. Furthermore, since the housing 17 is in substantial alignment with the walls of the valve stem guide 15, it does not offer any undue impedance or interference to the flow of air or gases through the passage 10.

The operation of the above described structure is as follows:

As the atmospheric temperature approaches freezing, such as around 40° F., for example, the bellows 21 tends to contract, allowing the plate 24, the tie rods 25, and the plate 26 to move upwardly under pressure of the spring 29 toward the valve stem 13. When a freezing temperature is encountered, the spring 29, with the abutment plate 26, will have attained such a position as to force the valve 6 upwardly away from its seat 12 and hold it in such position, where the partial vacuum upon the interior of the storage tank is released. Thus, if there is a temperature drop, causing a generation of less than atmospheric pressure in the interior of the storage tank, the difficulty heretofore incident to the freezing or clogging of the vacuum valve 6 in closed position, tending to produce an unsafe external or collapsing pressure upon the roof and walls of the storage tank, is avoided, since the storage tank can draw in a sufficient volume of air from the atmosphere to balance and offset the generated vacuum. And also, if there is then a temperature rise from below freezing, and if the pressure valve 5 should also be frozen or clogged into closed position, with an incident generation of internal, greater than atmospheric pressure in the storage tank, to unsafe proportions, the internal pressure within the tank can also be bled or passed out through the open vacuum valve 6.

Of course, as the atmospheric temperature again rises to above freezing, the bellows 21 will correspondingly expand, drawing the plate 24, tie rods 25 and plate 26 downwardly out of contact with the end of the valve stem 13, such as to the position shown in Fig. 2, and where the vacuum valve 6 can again function in its normal manner.

In the alternative form of construction shown in Fig. 3, a structure embodying our invention is shown as applied to a different type of vacuum vent valve 40, which instead of having a stem mounted internally in a guide, has a hollow, tubular sleeve 41 mounted externally on the rod guide 42. The guide 42 is carried in the fixed support 43 which in turn is attached to the valve housing 1' by means of the laterally extending arms 44.

A cup-shaped housing having its top wall in the form of a separately attached piece 46, is mounted in position on the under side of the support 43 by means of the threaded sleeve 47 engaging with the bottom end of the guide 42. The thermostatic element or bellows 48 is similarly mounted by means of the threaded stud 49 to the bottom end of the sleeve 47, as in the case of the mounting of the previously described bellows 21 in the construction of Fig. 2. A lower tie plate 50, tie rods 51 and an upper tie plate or abutment member 52 are assembled in connected relationship with the bellows 48. A coil spring 53 is mounted between the under side of the plate 52 and the upper side of the support 43. A washer 54 may be employed for positioning and aligning the spring 53. It will be noted that the tie rods 51 extend through openings in the top of the housing 45 and through the wire screen 55.

The operation of the alternative form of construction of Figs. 3 and 4, should readily be apparent to those skilled in the art after the previous description of the mode of operation of the construction of Fig. 2.

Referring now to Fig. 5 of the drawings, there is shown thereon an alternate form of construction comprising a housing 61 attached to the guide 62 of the valve 63 by means of the set screw 64. Pivotally mounted upon a shoulder 65 of the casing is a member 66, the screw 67 being provided for this purpose. A toggle comprising the arms 68 and 69 pivoted together as by the rivet at 71 is attached at one end thereof to the member 66 by the rivet 72 whereby the arms 68 are pivotally connected to the member 66. The other end of the toggle is pivotally mounted at 73 to the adjusting arm 74, the other end of the arm 74 being pivoted at the screw 75 passing through the shoulder 76 of the housing. An adjusting screw 77 is threaded through the housing and maintains the arm 74 in its adjusted position, the lock nut 78 being provided to maintain the screw in any of its set positions. A gas-filled thermostatic bellows 79 is pivotally mounted at one end thereof to the toggle at 71 and is provided with a recessed portion 82 at the other end thereof within which is disposed the adjusting screw 83 having a groove near the end thereof adapted to be engaged by the pins 84 whereby the bellows is pivotally mountted on the screw 83. The screw 83 is threaded in the housing 61 and maintained in any set position by the lock nut 85. A cover 86 is held in position by the screws 87 and completely encloses the thermostatic element when in position on the housing.

The contraction of the thermostatic bellows causes the toggle members 68 and 69 to be moved more nearly in alignment thereby exerting pressure upon the member 66 and causing the valve 63 to operate when the temperature of the thermostatic bellows has been reduced to a predetermined degree of temperature such, for example, as a temperature just above the point of freezing. The screws 77 and 83 are provided to control the pressure exerted upon the valve 63 as the device operates and the degree of movement of the valve. With an adjustment of the screws 77 and 83 such that the toggle arms 68 and 69 are in substantial alignment with the bellows contracted, the valve 63 is locked in an open position from which it can not be closed until the bellows expands and moves the toggle members out of substantial alignment.

The foregoing description refers to thermostatic bellows for operating the valve but other means may be employed for this purpose such, for example, as bi-metallic members or the Bourdon tube type of thermostatically actuated devices.

While the invention has been described in detail with respect to a certain preferred example thereof which gives satisfactory results, it will be understood by those skilled in the art, after understanding the invention, that various modifications and changes may be made without departing from the spirit and scope of the invention, and it is intended, therefore, in the appended claims to cover all such changes and modifications.

What is claimed as new and desired to be secured by Letters Patent of the United States is:

1. In a storage tank vent valve, the combination of a valve movement guide, a thermostatic element mounted on said guide, an abutment member adapted to move into contact with a portion of said valve but normally out of contact therewith, connecting means extending between said thermostatic element and said abutment member, and spring means bearing against said abutment member and urging it towards said valve.

2. In a storage tank vent valve, the combination of a valve movement guide, a housing member removably attached to said guide, a thermostatic element enclosed in said housing member, and means connecting said thermostatic element to said valve whereby low temperature movement of said thermostatic element tends to move said valve to open position.

3. In a storage tank vent valve, the combination of a valve movement guide, a housing member removably attached to said guide, a thermostatic element enclosed in and supported by said housing member, an abutment member adapted to move into contact with a portion of said valve but normally out of contact therewith, connecting means extending between said thermostatic element and said abutment member, and spring means bearing against said abutment member and urging it towards said valve, said connecting and spring means also being enclosed by said housing member.

4. In a storage tank vent valve, the combination of a valve movement guide, a housing member removably attached to said guide, a thermostatic element enclosed in said housing member, an abutment member disposed outside said housing member and adapted to move into contact with a portion of said valve but normally out of contact therewith, and a plurality of connecting members extending through said housing and connecting said thermostatic element to said abutment member.

5. In a storage tank vent valve, the combination of a valve movement guide, a housing member removably attached to said guide, a thermostatic element enclosed in said housing member, an abutment member disposed outside said housing member and adapted to move into contact with a portion of said valve but normally out of contact therewith, means extending through said housing for connecting said thermostatic element to said abutment member, and spring means mounted intermediate said guide and said abutment member for urging the abutment member towards said valve.

6. In a storage tank vent valve, the combination of a pair of spaced plates having a plurality of tie rods connected thereto for spacing the plates, one of said plates being adapted to move into contact with a portion of said valve but normally out of contact therewith, a fixed support, a thermostatic bellows mounted intermediate one side of said support and the other of said plates, and a spring mounted intermediate the other side of said support and said one of said plates.

7. In a storage tank vent valve, the combination of a valve stem guide, a pair of spaced plates, a plurality of tie rods for spacing said plates, one of said plates being adapted to move into contact with the end of said valve stem, a housing removably attached to said valve stem guide and having a transverse partition with apertures therein within which said tie rods are disposed, a thermostatic bellows mounted intermediate one side of said partition and the other of said plates, and a resilient element mounted between said one side of said partition and said one of said plates.

8. A device of the character disclosed for venting a storage tank and the like comprising a valve, a seat for said valve, a vertically disposed guide member within which the valve is adapted to move to closed position on said seat by the force of gravity and to open position away from said seat by the exertion of differential fluid pressure generated internally and externally of said tank, and means including a thermo-responsive element mounted on said guide member for disengaging the valve from said valve seat as the temperature of the ambient air approaches the freezing point of water.

9. A device of the character described for venting a storage tank and the like comprising a valve, a seat for said valve, a guide member within which the valve is adapted to move, a casing detachably mounted on said guide member, an abutment member disposed within said casing normally out of contact with, but in operative relation to said valve, and means including a thermo-responsive element controlled by variations in the temperature of the ambient air for operating said abutment member and causing it to contact said valve to disengage the latter from said seat.

10. A device of the character disclosed for venting a storage tank and the like comprising a valve adapted to be operated by a differential between internal tank pressure and atmospheric pressure, means movable independently of said valve and disposed in proximate relation thereto and adapted to contact said valve in a given position of movement, and means including a thermo-responsive element for actuating said movable means when near freezing temperatures are encountered by the device to cause the valve to open and be positively held in an open position, regardless of the differential pressures acting on said valve, until above freezing temperatures are encountered by the device.

GEORGE T. BLOOM.
W. H. McGUNAGLE.